(12) United States Patent
Ernst et al.

(10) Patent No.: US 11,577,312 B2
(45) Date of Patent: Feb. 14, 2023

(54) TOOL SET HAVING DEFLECTION COMPENSATION

(71) Applicant: GKN Sinter Metals Engineering GmbH, Radevormwald (DE)

(72) Inventors: Eberhard Ernst, Eichenzell (DE); Donald D. Cooper, Fond du Lac, WI (US); Hasim Tekines, Wachtberg (DE); Guido Schneider, Riedenberg (DE); Rainer Schmitt, Wachtberg (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 804 days.

(21) Appl. No.: 16/484,407

(22) PCT Filed: Feb. 8, 2018

(86) PCT No.: PCT/EP2018/053137
§ 371 (c)(1),
(2) Date: Aug. 7, 2019

(87) PCT Pub. No.: WO2018/146181
PCT Pub. Date: Aug. 16, 2018

(65) Prior Publication Data
US 2019/0358704 A1    Nov. 28, 2019

Related U.S. Application Data

(60) Provisional application No. 62/456,495, filed on Feb. 8, 2017.

(51) Int. Cl.
*B29C 43/32* (2006.01)
*B22F 3/03* (2006.01)
(Continued)

(52) U.S. Cl.
CPC .............. *B22F 3/03* (2013.01); *B30B 15/022* (2013.01); *B30B 15/067* (2013.01); *B33Y 80/00* (2014.12); *B22F 2003/033* (2013.01)

(58) Field of Classification Search
CPC ......... B29C 43/32; B30B 11/00; B30B 11/02; B30B 15/065; B30B 15/067; B30B 15/024
See application file for complete search history.

(56) References Cited

U.S. PATENT DOCUMENTS 3,444,719 A  *  5/1969  Roehrs ................... B21D 37/10
                                                              72/352
2004/0197219 A1   10/2004  Degen et al.
2017/0087638 A1    3/2017  Schmitt et al.
(Continued)

FOREIGN PATENT DOCUMENTS

DE    102015201966 A1    8/2016
JP    H04147798 A         5/1992
(Continued)

OTHER PUBLICATIONS

Japan Patent Office, Notification of Reasons for Refusal, Application No. 2019-563688, dated Mar. 2, 2021, 12 pages [English Language Translation Only].
(Continued)

*Primary Examiner* — Joseph S Del Sole
*Assistant Examiner* — Thu-Khanh T. Nguyen
(74) *Attorney, Agent, or Firm* — Quarles & Brady LLP

(57) ABSTRACT

A tool and die set and related method of use of the tool and die set in a press for the compaction of a powder metal into a preform involves an uneven amount of positional deflection of at least two lower or upper tool members. This asymmetrical elastic response under load may help to eliminate cracking of the part after the compressive load is removed.

20 Claims, 6 Drawing Sheets

(51) Int. Cl.
  *B33Y 80/00* (2015.01)
  *B30B 15/02* (2006.01)
  *B30B 15/06* (2006.01)

(56) References Cited

U.S. PATENT DOCUMENTS

2018/0015680 A1  1/2018  Schmitt et al.
2018/0022050 A1  1/2018  Ernst et al.
2018/0236547 A1  8/2018  Schmitt et al.
2018/0281063 A1  10/2018  Schmitt et al.

FOREIGN PATENT DOCUMENTS

JP     H0788699 A    4/1995
JP     H09143508 A   6/1997

OTHER PUBLICATIONS

China National Intellectual Property Administration, First Office Action and Search Report, Application No. 201880009719.8, dated Apr. 21, 2021, 32 pages.
Intellectual Property India, Examination Report, Application No. 201937033719, dated Aug. 18, 2021, 7 pages.
China National Intellectual Property Administration, Second Office Action, Application No. 201880009719.8, dated Oct. 27, 2021, 26 pages.
Japan Patent Office, Decision of Refusal, Application No. 2019-563688, dated Nov. 9, 2021, 14 pages.
PCT International Search Report and Written Opinion, PCT/EP2018/053137, dated May 22, 2018, 16 pages.

\* cited by examiner

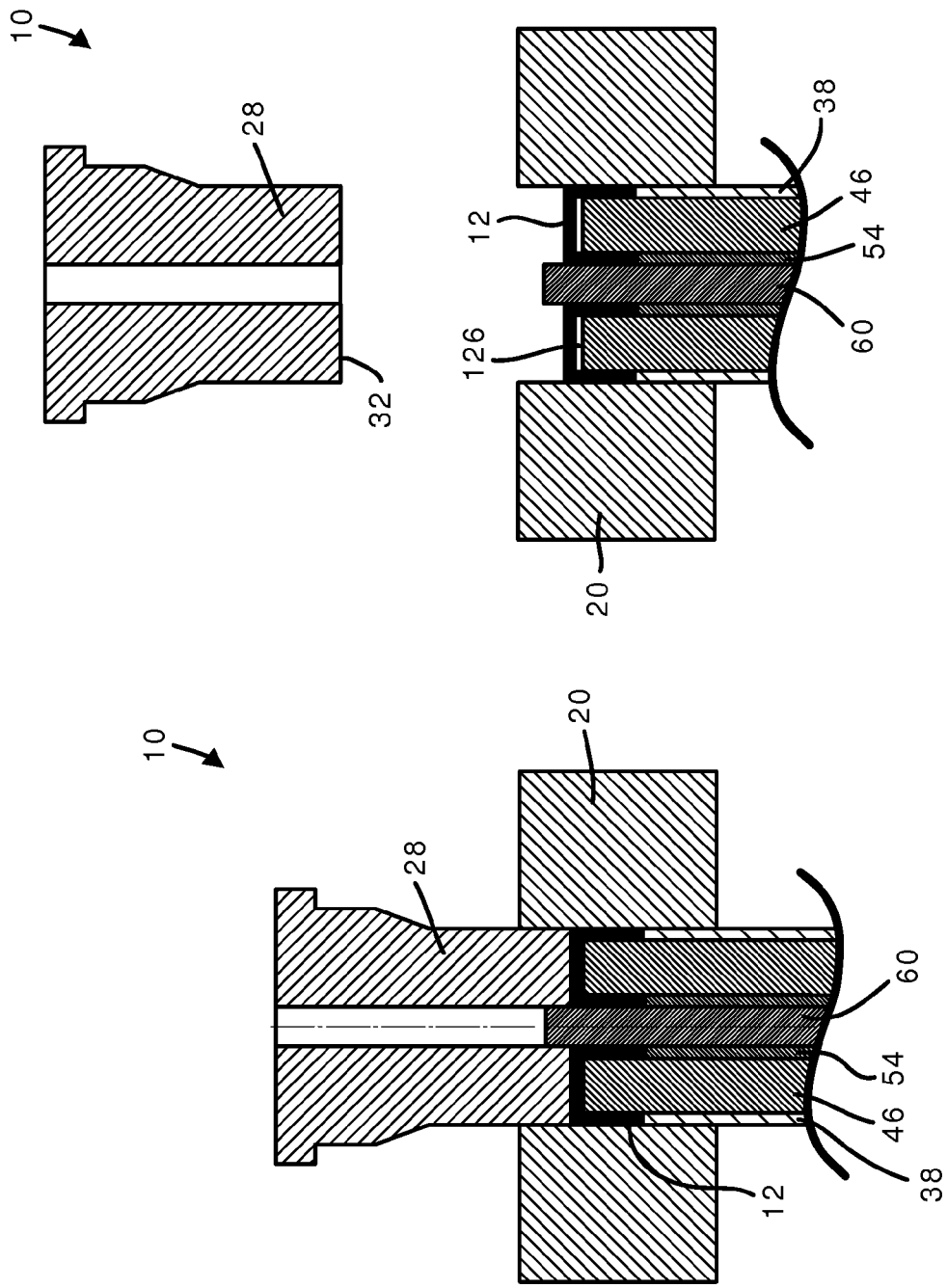

TOOL SET HAVING DEFLECTION COMPENSATION

CROSS-REFERENCE TO RELATED APPLICATION

This application represents the U.S. national stage entry of International Application No. PCT/EP2018/053137 filed Feb. 8, 2018, which claims the benefit of the filing date of U.S. Provisional Patent Application No. 62/456,495 entitled "Tool Set Having Deflection Compensation" filed on Feb. 8, 2017, which is hereby incorporated by reference for all purposes as if set forth in its entirety herein.

STATEMENT OF FEDERALLY SPONSORED RESEARCH OR DEVELOPMENT

Not applicable.

FIELD OF THE INVENTION

This disclosure relates to an improved tool set for the compaction of powder metal components and related methods of producing a powder metal compact using these improved tool set.

BACKGROUND

Metal components can be formed in a number of different ways. One of these ways for fabricating metal components is powder metallurgy. While various techniques exist for forming powder metal into components, many components are formed by the uni-axial compaction of powder metal in a tool and die set in a press to form a preform that is then ejected and sintered. Although some secondary operations may be performed on the part after sintering, the as-sintered component is often very close to final dimensions. Thus, powder metallurgy offers an economical way to produce large volumes of components that are near net shape.

SUMMARY

While the fabrication of powder metal components appears ostensibly simple, there are, in fact, many challenges when the fabrication steps are examined in greater detail.

For example, the tool and die set in the press typically includes multiple tool members, inserted into the top and bottom of the die cavity, that are actuated by the press to compact the powder metal into the preform and then to effectuate ejection of the metal preform. These tools are often separately movable and engage different surfaces of the powder metal preform. In the current state of the art, these various tool members exhibit an identical or nearly identical elastic response.

However, the design of the preform often results in at least some the various tool members being subjected to different load conditions. As one example, the powder metal preform often has a geometry requiring a number of powder metal columns some of which have differing heights. When a preform having this type of geometry is compacted, the difference in the column height across the sections means that different tool members may experience different loads and/or amounts of deflection. For example, during compaction a taller vertical column of powder metal will respond differently that a shorter vertical column of powder metal. There are many reasons for this including the increased surface area against which the powder may be compressed against the side wall of the die or another tool member. So the tool members will often need to exert more pressure on a taller column than a shorter column in order to compress the taller column to a roughly equal density to that of the shorter column. The taller column—shorter column example is provided as one example, but it should be appreciated that it is not only a height-based inquiry and design considerations are frequently more complicated than simply height. As another example, the amount of side wall contact will alter the manner in which a particular column will be compacted. So a first feature having a smaller amount of side wall contact than a second feature having a greater amount of side wall contact may require less pressure to compact to similar density, even if the first and second features are the same height as one another.

In any event, it is the case that in the current state of the art, despite the tool members having identical or nearly identical elastic response to one another, the actual deflection of the various tool members will differ from one another. For nearly any tooling arrangement having more than one upper tool member or more than one lower tool member, differential deflection of the tool members will occur.

Among other things, this differential tool deflection means that, under the applied load to compact the powder metal into the preform, the tools may all exhibit some amount of differential deflection during elastic deformation and then, once the load is released, the tools will quickly deflect back to their unstressed length. One possible result of this equal elasticity, but unequal deflection, design is that, upon removing the load of the press, the position on the surfaces of the tools that form the part will deflect to varying degrees. In many instances, this differential deflection after the load is removed will place stress on the preform, causing the formation of cracks in the preform.

Disclosed herein is an improved tool and die set for a press and a related method of use. The improved tool and die set provide an asymmetrical deflection of the various tool members to avoid problems such as the aforementioned cracking of the preform once the compressive load is removed. It will be appreciated that when describing the elastic response or the deflection of the tool members in this application that this elastic response or deflection is not based solely on the mechanical response or elastic deformation of the tool members, but also may include the mechanical response or elastic deformation of other components of the respective tool set such as adaptors that support the tool members.

According to one aspect, a method of using a tool and die set in a press is provided. The tool and die set includes a die having a die cavity formed therein in which the die cavity extends from a top side to a bottom side of the die, one or more lower tool member(s) of a lower tool set received in the die cavity from the bottom side of the die, and one or more upper tool member(s) of an upper tool set that are receivable in the die cavity from the top side of the die. The die cavity is filled with a powder metal according to the method. Then, the upper tool members(s) are then lowered into the die cavity from the top side of the die. The powder metal is then compacted in the die cavity by application of a compressive load by the upper tool set and the lower tool set by opposing upper and lower faces of the lower tool member(s) and the upper tool member(s) by actuation of the lower tool set and the upper tool set by the press to respective positions in which the die, the lower tool member(s), and the upper tool member(s) collectively define the geometry of the preform under the compressive load. The upper tool member(s) are lifted from the die, thereby removing the compressive force and relaxing the upper tool set and the lower tool set. At least one of the upper tool member(s) and the lower tool member(s) includes a plurality of tool members in which a first tool member of the plurality of tool members has a first elastic response under the compressive load resulting in a first amount of positional deflection of a first preform-contacting surface of the first tool member and in which a second tool member of the plurality of tool members has a second elastic response under the compressive load resulting in a second amount of positional deflection of a second preform-contacting surface in the second tool member. The first amount of positional deflection is different than the second amount of positional deflection.

At least two of the tool members in the group of the upper tool member(s) or the group of the lower tool member(s) may have an asymmetrical elastic response to the compressive load.

The preform may include a plurality of sections with at least two of the plurality of sections having different heights and the different deflections result in partial stripping of at least one of the sections from at least one of the tool members. To properly form these columns of different heights, different compressive loads may be applied by the different tool members, and if the positional deflection of the tool members are not unequal, then one of the tools may undesirably relax when the compressive force is lifted, instigating a crack in the preform under stress. Thus, an asymmetrical deflection may be used to help maintain the structural integrity of the preform after the load is removed.

The first amount of positional deflection may be greater than the second amount of positional deflection and wherein the first amount of positional deflection may be between 0.02 mm to 0.2 mm different from the second amount of positional deflection.

The plurality of tool members may further include a third tool member and the third tool member may have a third elastic response under the compressive load resulting in a third amount of positional deflection in the third tool member. This third amount of positional deflection may be different than the first amount of positional deflection and the second amount of positional deflection or may be the same as one of the two.

The first tool member and the second tool member may be included in the group of lower tool members. The lower tool set may include a first adaptor supporting the first tool member and a second adaptor supporting the second tool member. The first adaptor may at least partially account for the first amount of positional deflection of the first tool member and the second adaptor may at least partially account for the second amount of positional deflection of the second tool member. Thus, the tool members plus their respective adaptors may dictate the overall elastic response and positional deflection of any particular tool member.

During the step of compacting the powder metal, a first upper surface of the first tool member (i.e., the first preform-contacting surface) may be positioned in the die cavity lower than a second upper surface of the second tool member (i.e., the second preform-contacting surface) relative to the top side of the die under the compressive load. Upon release of the compressive load, the first tool member may relax the first amount of positional deflection and the second tool member may relax the second amount of positional deflection such that, upon relaxation, the second tool member does not apply a force to the preform.

The method may further include the step of ejecting the preform from the die cavity by raising the upper surfaces of the at least one lower tool member to be level with the top side of the die. Further, they may relax to an extent such that a gap is created between the second tool member and the preform. The gap may be 0.02 mm to 0.2 mm, for example.

According to another aspect, a tool and die set is provided for use in a press for the compaction of a powder metal into a preform. The tool and die set includes a die, a lower tool set, and an upper tool set. The die has a die cavity formed in the die in which the die cavity extends from a top side to a bottom side of the die. The lower tool set includes one or more lower tool members receivable in the die cavity from the bottom side of the die and the upper tool set includes one or more upper tool members receivable in the die cavity from the top side of the die. The die, the lower tool member(s), and the upper tool member(s) are receivable in the press and the lower tool member(s) and the upper tool member(s) are each movable to a position in which the die, the lower tool member(s), and the upper tool member(s) collectively define a geometry of the preform in the die cavity under a compressive load applied by the press. At least one of the upper tool member(s) and the lower(s) tool member include a plurality of tool members. A first tool member of the plurality of tool members has a first elastic response under the compressive load, resulting in a first amount of positional deflection of the first tool member. A second tool member of the plurality of tool members has a second elastic response under the compressive load resulting in a second amount of positional deflection of the second tool member. The first amount of positional deflection is different than the second amount of positional deflection.

Stated another way, at least two of the tool members in the upper tool member(s) and the lower tool member(s) may have an asymmetrical elastic response to load.

The plurality of tool members may further include a third tool member and the third tool member may have a third elastic response under the compressive load resulting in a third amount of positional deflection in the third tool member. The third amount of positional deflection may be different than the first amount of positional deflection and the second amount of positional deflection or may be the same as one of the two.

The first amount of positional deflection may be greater than the second amount of positional deflection. In some forms, the first amount of deflection may be between 0.02 mm and 0.2 mm different from the second amount of positional deflection.

At least one of the first tool member and the second tool member may come in contact with the preform as a result of the difference between the first and second amounts of positional deflection. The lower tool set may include a first adaptor supporting the first tool member and may further include a second adaptor supporting the second tool member. The first adaptor may at least partially account for the first amount of positional deflection of the first tool member and the second adaptor may at least partially account for the second amount of positional deflection of the second tool member.

If there are one or more adaptors, those adaptors may be formed in a number of ways to help provide the asymmetrical elasticity response. For example, one or more of adaptors may be formed by additive manufacturing and/or by three-dimensional printing.

In the case where there are multiple lower tool members, during compaction, a first upper surface of the first tool member may be positioned in the die cavity lower than a second upper surface of the second tool member relative to the top side of the die under the compressive load. Then, upon release of the compressive load, the first tool member may relax the first amount of positional deflection and the second tool member may relax the second amount of positional deflection such that the second tool member does not apply a force upon relaxation to the preform resulting in cracking.

Thus, a tool and die set and related method of use is provided in which at least one of the upper or lower tool sets is provided with an uneven or asymmetric elastic response. In contrast to the conventional methods and tool and die sets in the state of the art, the differential positional deflection of the tool members during compression and relaxation helps to avoid the instigation of cracks in the preform, such as those cracks that may form when one of the tools compress and relaxes more than the other as a result of compacting powder columns of various heights.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIG. 4A through 4E are cross-sectional side views of the exemplary tool and die set from FIG. 1 showing the steps associated with compacting the powder metal including (A) the lower tool set in a fill position in the die cavity and with the upper tool set above the die cavity, (B) the powder metal filled into the die cavity, (C) the upper tool set lowered into the die cavity to compact the powder metal under a compressive load to form the preform from the powder metal, (D) the upper tool set being lifted to remove the compressive load and the asymmetrical relaxation of the members of the lower tool set, and (E) the lower tool members being moved to the ejection position level with the top side surface of the die.

DETAILED DESCRIPTION

Figure 1:
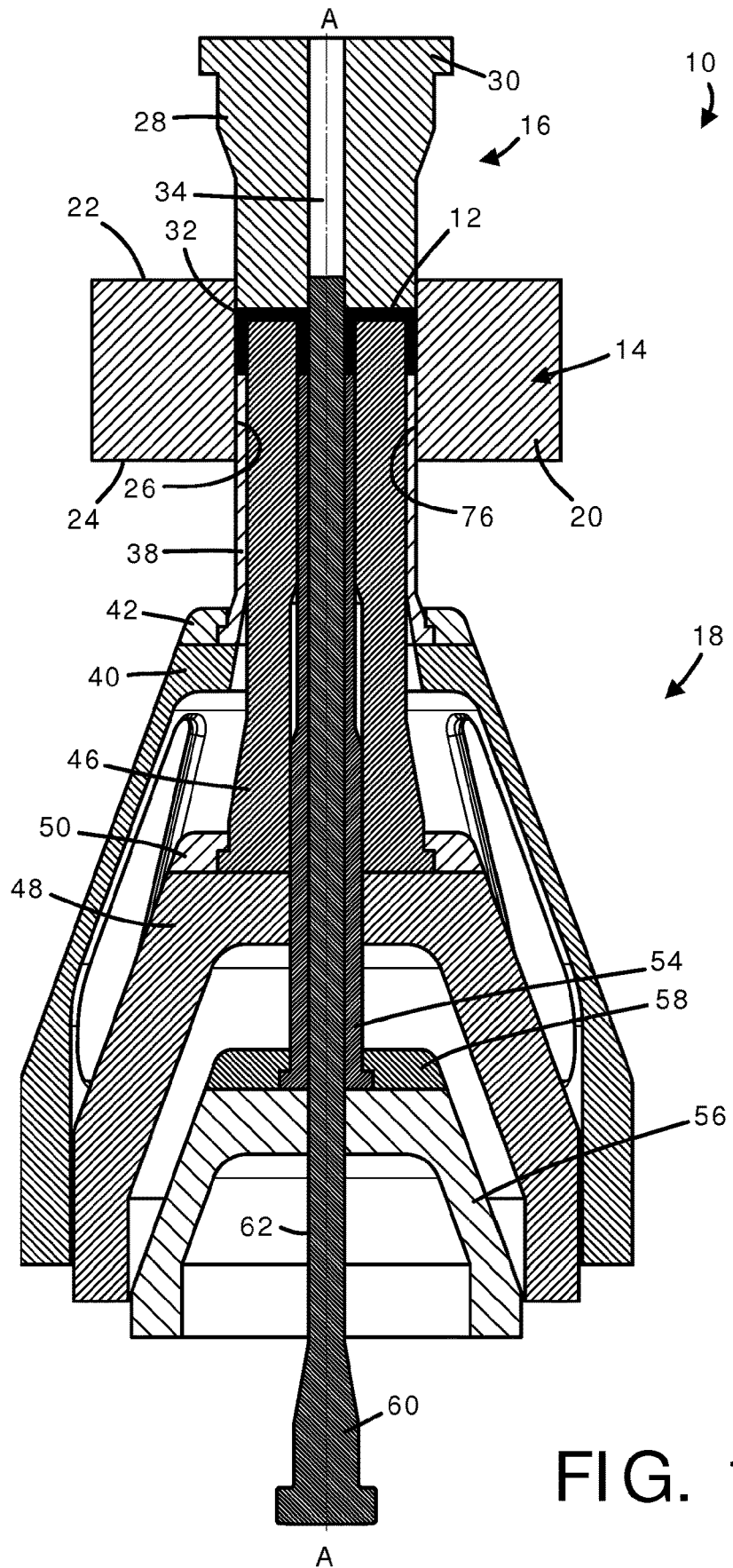
FIG. 1 is a cross-sectional side view of an exemplary tool and die set for forming a preform from powder metal.
Figure 2:
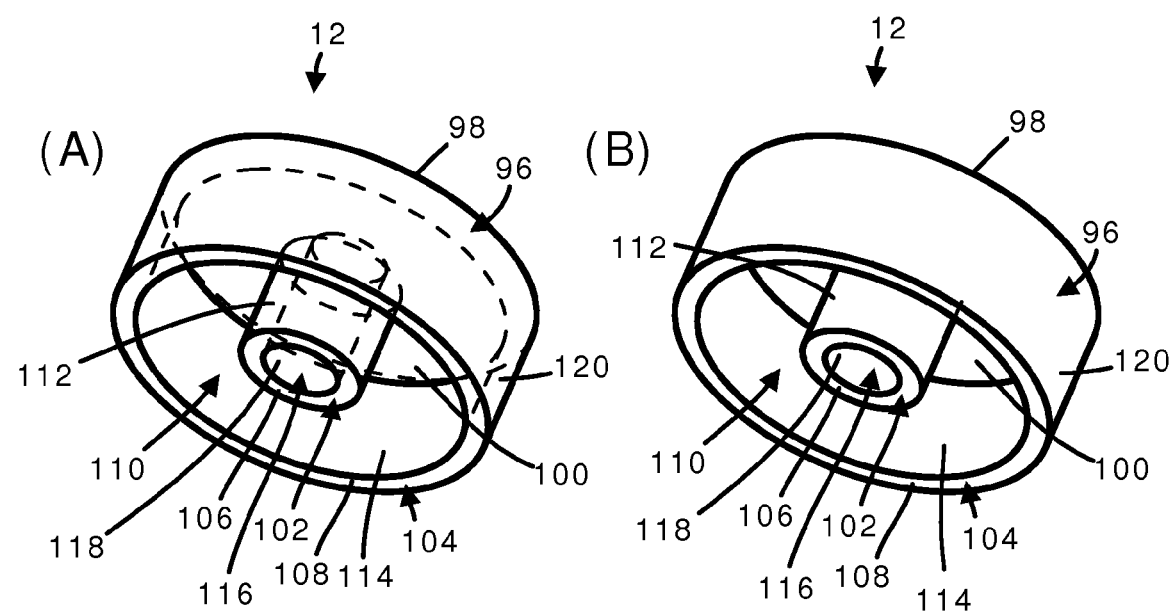
FIG. 2 is a bottom, side perspective view of the prefrom made from the tool and die set of FIG. 1.

Referring first to FIGS. 1 and 2, a tool and die set 10 (FIG. 1) is illustrated for forming a preform 12 from powder metal. The tool and die set 10 is received in a press (not shown) that will actuate the tool and die set 10 to form the preform 12 under a compressive load as will be described in greater detail below.

The exemplary tool and die set 10 includes a die 14, an upper tool set 16, and a lower tool set 18. These parts are generally aligned along a central axis A-A, which also defines the uniaxial direction along which the various components of the tool and die set 10 may be separately actuated by the press (that is, raised or lowered relative to one another).

Looking first at the die 14, the die 14 includes a die body 20 extending from a top side 22 to a bottom side 24. A die cavity 26 extends in an axial direction through the die body 20 from the top side 22 to the bottom side 24 of the die 14. The die cavity 26 is generally uniform in profile from the top side 22 to the bottom side 24 and has a section in a direction perpendicular to the central axis A-A that corresponds to an outer periphery of the preform 12. This profile of the die cavity 26 also accommodates the reception of the upper tool set 16 and the lower tool set 18 from the top side 22 and the bottom side 24. In some instances, the die body 20 may be formed from a single material; however, in many instances, the die cavity 26 may be defined by an insert section received in another surrounding section, such that the insert may be made from a hardened material, while the surrounding section may be made from another material.

Turning now to the upper tool set 16, the upper tool set 16 as illustrated in the exemplary embodiment includes a single upper punch 28 (as an upper tool member). The upper punch 28 has an upper side which includes a flange 30 for clamping (likely into an adaptor that is driven by the press) and has a lower preform-contacting surface 32 with an outer periphery that corresponds to the periphery of the die cavity 26 in which the lower end of the upper punch 28 will be received. The upper punch 28 also includes a central axially-extending opening 34 formed therein that will receive a core rod in the lower tool set 18.

At this point, it should be noted that the single upper punch 28 is merely one exemplary tool member from the exemplary configuration and that, in other tool and die sets there may be additional tool members in the upper tool set. It will be further appreciated that when referring to a tool set (regardless of whether the tool set is an upper or lower tool set), the tool set may both include one or more tool members such as, for example, punches and core rods as well as, in many cases, corresponding adaptors and adaptor clamps to which these tool member(s) may be intermediately connected to before their mechanical attachment to the parts of the press (for example, a platen).

Figure 3:
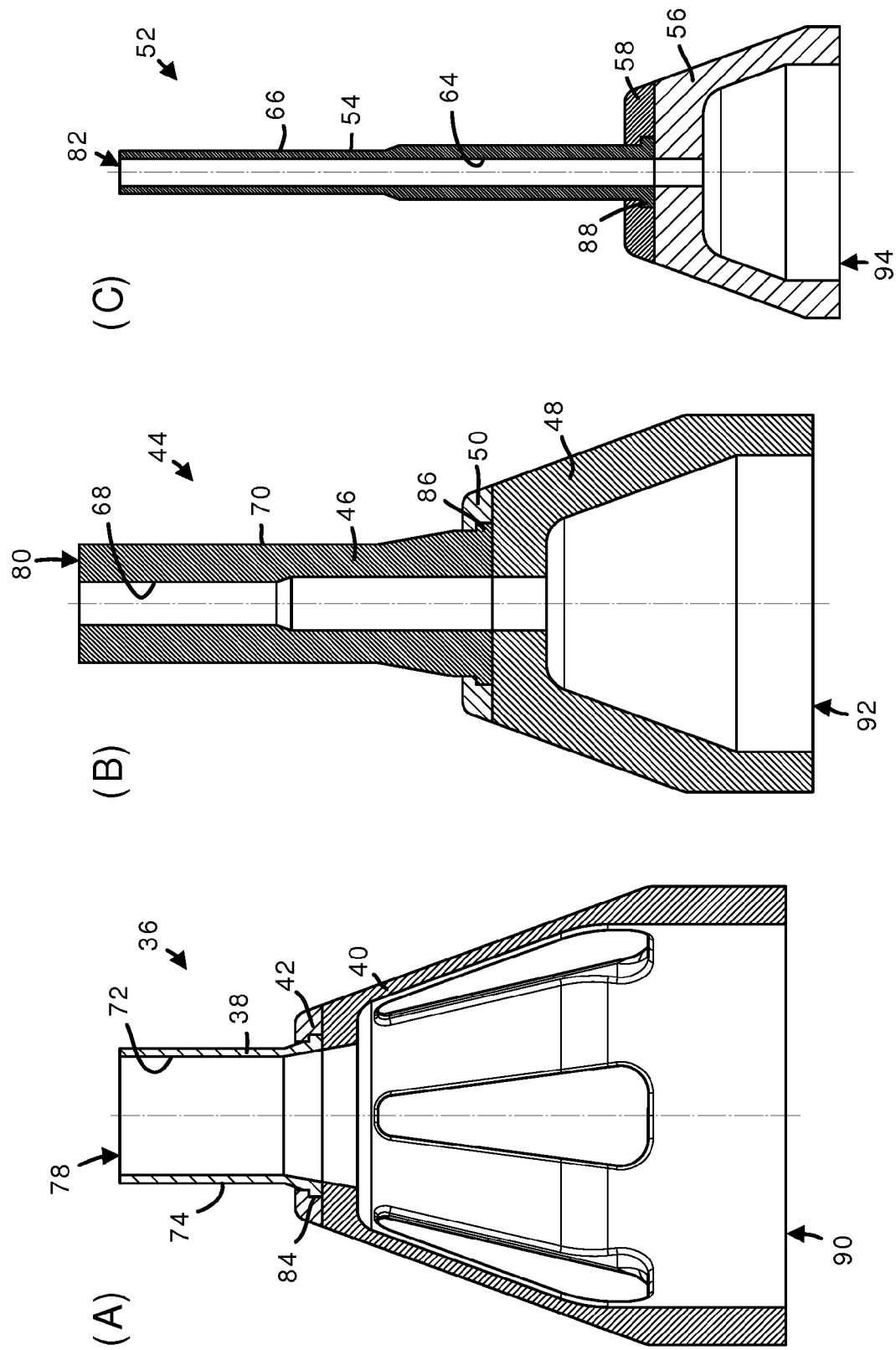
FIGS. 3A through 3C are side cross-sectional views of the various components of the lower tool set including both the tool members and their respective adaptors in each of the separate figures.

With continued reference to FIG. 1 and additional reference now being made to FIGS. 3A through 3C, the lower tool set 18 includes four separately movable portions. The first, outer portion 36 is separately illustrated in FIG. 3A and includes a lower outer punch 38 and a corresponding lower outer adaptor 40 and a lower outer clamp ring 42. The second, middle portion 44 is separately illustrated in FIG. 3B and includes a lower middle punch 46 and a corresponding lower middle adaptor 48 and a lower middle clamp ring 50. The third, inner portion 52 is separately illustrated in FIG. 3C and includes a lower inner punch 54 and a corresponding lower inner adaptor 56 and a lower inner clamp ring 58. The fourth central core rod portion is not illustrated FIGS. 3A through 3C, but is shown in FIG. 1, and includes a core rod 60.

As can be seen best in FIG. 1, the various sections of the lower tool set 18 are nested into one another such that various corresponding side surfaces of adjacent tool members are slidably received next to one another. To briefly summarize the exemplary arrangement, the inner portion 52 is nested around the core rod section such that a radially outward facing surface 62 of the core rod 60 is positioned adjacent to a radially inward facing surface 64 of the lower inner punch 54 (lower tool member). The middle portion 44 is nested around the inner portion 52 such that a radially outward facing surface 66 of the lower inner punch 54 is positioned adjacent to a radially inward facing surface 68 of the lower middle punch 46 (lower tool member). The outer portion 36 is nested around the middle portion 44 such that a radially outward facing surface 70 of the lower middle punch 46 is positioned adjacent to a radially inward facing surface 72 of the lower outer punch 38 (lower tool member). A radially outward facing surface 74 of the lower outer punch 38 is positioned adjacent the radially inward facing surface 76 of the die cavity 26 of the die 14.

It is observed that each of the lower outer punch 38, the lower middle punch 46, and the lower inner punch 54, despite their different sizes and geometries, have similar features. For example, each of the lower outer punch 38, the lower middle punch 46, and the lower inner punch 54 have a corresponding preform-contacting surface 78, 80, and 82 at an upper end of the respective punches and a corresponding flange 84, 86, and 88 for clamping each respective punch 38, 46, and 54 to its respective adaptor 40, 48, and 56 via its respective clamp ring 42, 50, and 58.

At this stage, it is noted that each of the outer portion 36, the middle portion 44, and the inner portion 52 have an unloaded height from a respective lower end 90, 92, and 94 of the respective adaptor 40, 48, and 56 to the preform-contacting surface 78, 80, and 82 at the upper end of the respective punch 38, 46, and 54. Upon the application of a uniaxial compressive load in the disclosed tool and die set 10, there are differing amounts of deflection between the unloaded heights and the loaded heights (from the respective bottoms of the adaptors to the upper pre-form contact surfaces) across the various portions. This effectively means that there are different amounts of positional deflection that occur under compression and subsequent relaxation across at least some of the portions.

To achieve these varying degrees of positional deflection across the tool members or punches, the adaptors and/or punches may be designed to have different elastic responses. For example, it can be seen that the lower outer adaptor 40 is formed with openings in the wall that can be used to alter the elastic response. It is contemplated that the tool members or adaptors may be formed in various ways (for example, additive manufacturing or three-dimensional printing) to create this difference in elasticity and positional deflection among at least some of the tools.

Turning back to the preform 12 in FIGS. 2A and 2B, the geometry of the preform 12 is shown in greater detail, which also defines various surfaces of the tool and die set 10 which form the preform 12. The preform 12 is generally puck-shaped, having a top disc-like section 96 having an upwardly axially facing surface 98 and a downwardly axially facing surface 100. The disc-like section 98 has an inner circular wall 102 and an outer circular wall 104 extending downwardly from the bottom side thereof to an axially facing inner wall surface 106 and an axially facing outer wall surface 108, respectively. A recess 110 is established on the bottom side of the preform 12 that is defined by the space between a radially outward facing surface 112 of the inner circular wall 102, a radially inward facing surface 114 of the outer circular wall 104, and the downwardly axially facing surface 100 of the top disc-like section 96. A circular through hole 116 having a radially inward facing wall 118 extends from the upwardly axially facing surface 98 through the inner circular wall 102 to the axially facing inner wall surface 106. The preform 12 also has a radially outward facing surface 120 on the outer circular wall 104 that defines the outer horizontal periphery of the preform 12.

With the tool and die set 10 and the preform 12 now having been defined, the method of using the exemplary tool and die set 10 to form the exemplary preform 12 is now described in greater detail with reference to FIGS. 4A through 4E. In FIGS. 4A through 4E, the tool and die set 10 is shown in detail in the region in which the preform 12 will be compacted.

Figure 4B:
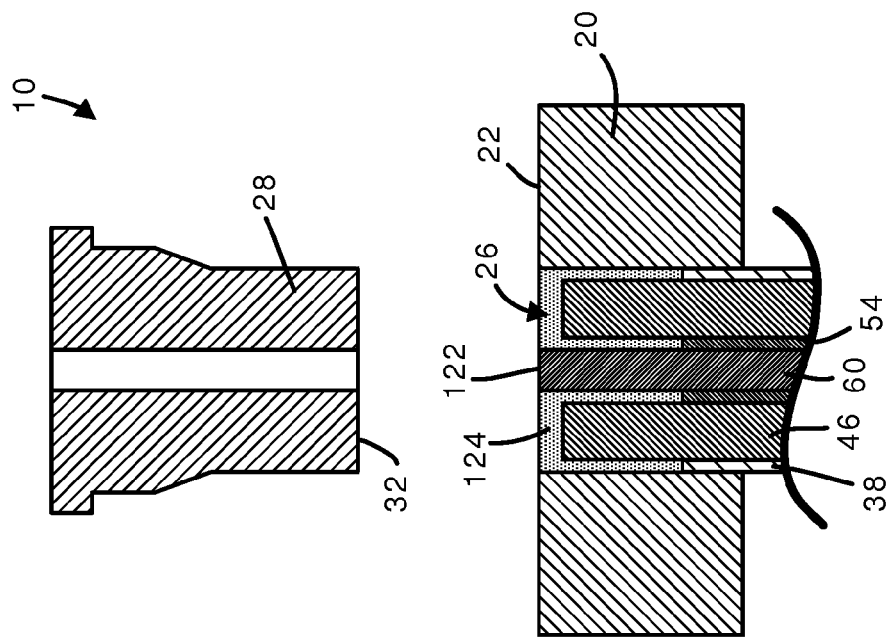
Figure 4A:
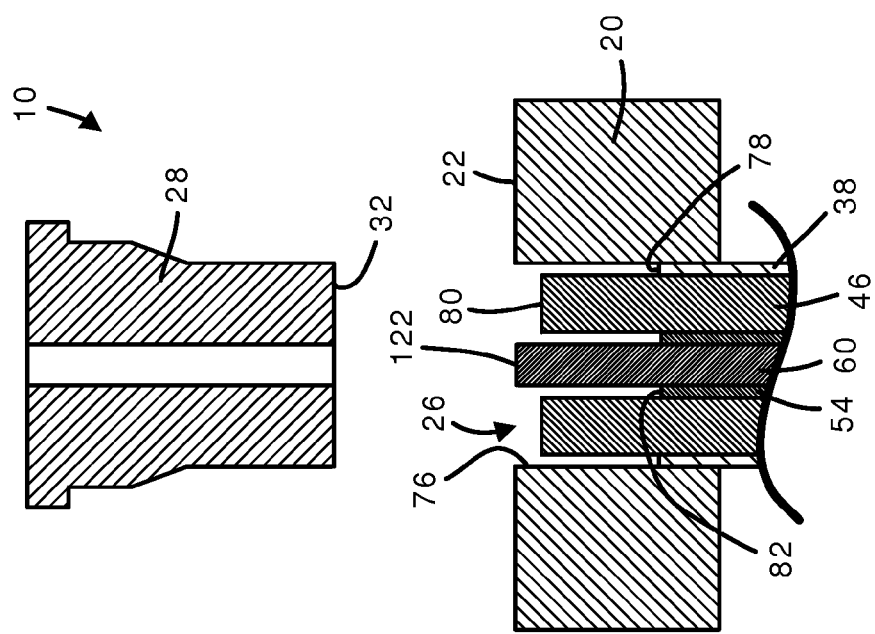

Looking first at FIG. 4A, the various members of the tool and die set 10 is illustrated in the fill position. In this position, the lower preform-contacting surface 32 of the upper punch 28 is withdrawn from the die cavity 26 of the die 14 and the tool members of the lower tool set 18 are in their fill positions. More specifically, an upper surface 122 of the core rod 60 is flush with the top side 22 of the die 14 and the preform-contacting surfaces 78, 80, and 82 of the lower outer punch 38, the lower middle punch 46, and the lower inner punch 54, respectively, are downwardly spaced a vertical distance from the top side 22 of the die 14.

This vertical spacing is established to powder fill for each of the respective columns for forming the preform 12. For example, it may be the case that each vertical spacing may be approximately 1.8 times the final height dimensions of the respective column of the preform 12 depending on the flowability of the uncompressed powder metal and the compressive response of the powder metal. It should be appreciated that in the instant exemplary embodiment, the specific preform geometry does not require powder metal columns to be shifted upward because there is not a complex, multipart upper tool set. However, those having skill in the art will know the manner in which the fill should be performed in order to establish the final preform geometry and it is contemplated that more complex fill patterns may be undertaken than those illustrated in the exemplary case.

It will also be understood at this point that the powder metal 124 may comprise some amount of non-metallic binder, wax, and/or lubricant that may help to adjust the flowability of the powder metal 124, assist in maintaining the geometry of the preform 12 after compaction (prior to the preform 12 being sintered and the material likely being burned off), and assist in the ejection of the preform 12 from the tool and die set 10 as will be described in greater detail below.

With the various tools in the position illustrated in FIG. 4A, the die cavity 26 is filled with a powder metal 124 that is to be subsequently compacted into the preform 12. Typically, a feed shoe (not shown) may come in flush along the top side 22 of the die 14 and go over the die cavity 26 to fill the die cavity 26 with the powder metal 124 as illustrated in FIG. 4B and level the top surface of the powder metal to be even with the planar top side 22 of the die 14 and the upper surface 122 of the core rod 60 (which designates a vertical column where powder metal is not received that will be a through hole in the preform 12. This effectively fills the die cavity 26 with vertical columns of powder metal from the respective preform-contacting surfaces 78, 80, and 82 of the lower outer punch 38, the lower middle punch 46, and the lower inner punch 54 to the upper powder fill line which is level with the top side 22 of the die 14.

With the powder metal being received in the die cavity 26 as illustrated in FIG. 4B, the upper tool set 16 and the lower tool set 18 are moved towards one another to apply a compressive force to the powder metal 124 and form the preform 12 as illustrated in FIG. 4C. In this particular exemplary case, this involves lowering the upper punch 28 into the die cavity 26 such that it compresses the powder metal 124 downward with the core rod 60 entering the central axially-extending opening 34 while the lower outer punch 38, the lower middle punch 46, and the lower inner punch 54 are simultaneously raised to upwardly compress the powder metal 124. It is noted that, for the particular geometry of the preform 12, the lower outer punch 38 and the lower inner punch 54 are lifted the same amount, while the lower middle punch 46 is raised a different and lesser amount than the other two lower punches in accordance with the desired vertical column height of the preform 12 in each of their respective sections.

In this particular arrangement, the various surfaces of the preform 12 are defined by the following surfaces of the tool members. The upwardly axially facing surface 98 is defined by the lower preform-contacting surface 32 of the upper punch 28. The radially inward facing wall 118 of the circular through hole 116 is formed by the radially outward facing surface of the core rod 60. The radially outward facing surface 120 on the outer circular wall 104 is defined by the radially inward facing surface 76 of the die cavity 26 of the die 14. The axially facing outer wall surface 108, the downwardly axially facing surface 100, and the axially facing inner wall surface 106 are formed by the preform-contacting surfaces 78, 80, and 82 of the lower outer punch 38, the lower middle punch 46, and the lower inner punch 54, respectively. The radially inward facing surface 114 of the outer circular wall 104 and the radially outward facing surface 112 of the inner circular wall 102 are defined by the radially outward facing surface 70 of the lower middle punch 46 and the radially inward facing surface 68 of the lower middle punch 46, respectively.

Notably, different amounts of compressive load are used across the different vertical columns to achieve compact the powder metal. As noted above, the amount of positional deflection across the tool members of the preform contacting surfaces in at least one of the upper tool set and the lower tool set (here, just the lower tool set) are used to achieve asymmetrical elasticity across at least some of the various tool members. In the instant exemplary example, the preform-contacting surfaces 78 and 82 of the lower outer punch 38 and the lower inner punch 54 with their respective adaptors 40 and 56 are engineered to result in equal positional deflection of preform-contacting surfaces 78 and 82 upon compression and relaxation. However, the preform-contacting surface 80 of the lower middle punch 46 is engineered to have less positional deflection than the preform-contacting surfaces 78 and 82 of the lower outer punch 38 and the lower inner punch 54. Although there is a difference in position deflection between the inner and outer punches and the middle punch in the exemplary embodiment, this difference is still relatively small in magnitude, for example, in a range of 0.02 mm to 0.2 mm different or, more particularly in some forms, within approximately 0.2 mm of one another.

Although this difference in positional deflection and asymmetrical elasticity may not appear to be significant during the compaction step in FIG. 4C, the benefits of this difference are visualized in FIG. 4D, in which the compressive force has been withdrawn after the preform 12 is formed. As can be seen in FIG. 4D, upon withdrawing the upper punch 28, the lower punches 38, 46, and 54 relax. Given the differences in engineered elastic response, the lower outer punch 38 and the lower inner punch 54 relax approximately the same amount which is greater than the elastic relaxation of the lower middle punch 46. Accordingly, a gap 126 is created between the preform 12 and the preform-contacting surface 80 of the lower middle punch 46 as the lower outer punch 38 and the lower inner punch 54 lift the preform 12 relative to the inner middle punch 46. Thereby this differential deflection of the punches results in partial stripping of the preform from the tooling, namely from the punch 46. As state above, the gap 126 may be 0.02 mm to 0.2 mm, for example.

It should be appreciated that under typical balance elasticity conditions among the various tool members, that the difference in the vertical height of the columns may result in a greater amount of relaxation in the inner middle punch 46. This increased differential relaxation and positional deflection of the preform-contacting surface 80 of the lower middle punch 46 in contrast to the inner and outer punches 54 and 38 as well as possible binding of the preform 12 on the surface 76 of the die 14 could result in the lower middle punch 46 deflecting upward in the preform 12 and the surface 80 might apply an upward force or stress to the preform 12 at the downwardly axially facing surface 100 which initiates a crack in the preform 12 (with said crack typically extending horizontally through the side walls). The asymmetrical elasticity of the tool members prevents this condition from occurring.

Figure 4E:
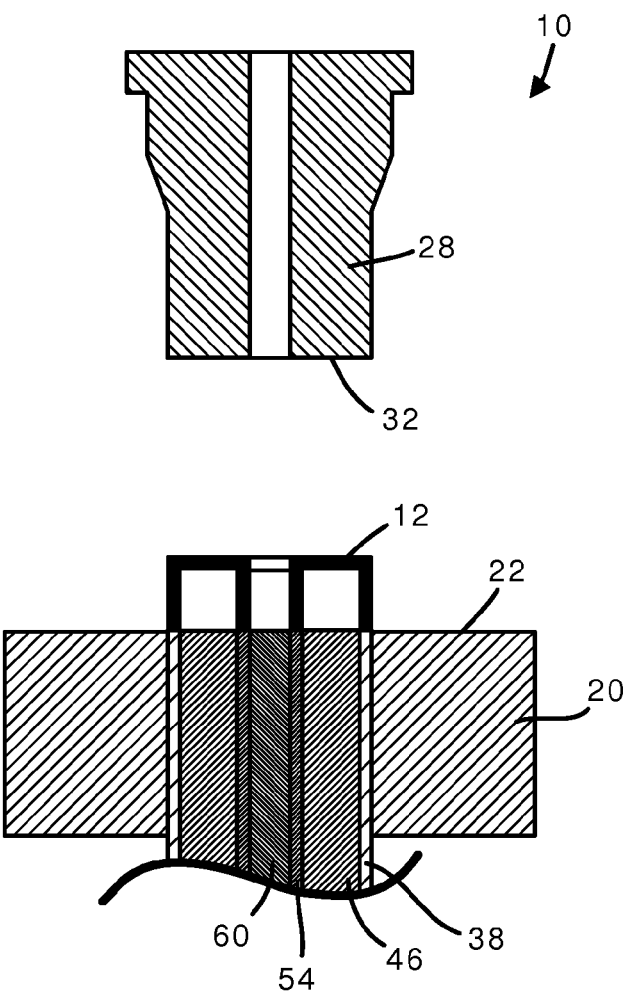

After the compressive load has been withdrawn and the tool members relax as illustrated in FIG. 4D, the preform 12 may then be ejected as in FIG. 4E. In FIG. 4E, the upper surfaces of all of the lower tool members (that is, the preform contacting surfaces 78, 80, and 82 of punches 38, 46, and 54 and the upper surface 122 of the core rod 60) are all raised to be flush with the top side 22 of the die 14. In this ejected position, the preform 12 is removed from the tool and die set 10 and may be subsequently processed—typically sintered—in order to form a final sintered powder metal part.

Again, this tooling arrangement and described arrangement is exemplary only and the particular geometry of the preform will dictate the number, types, and arrangement of the various components and the upper and lower tool sets. Different compact forms will have different tooling arrangements and it is contemplated that the methods and principles described herein are workable with different preform geometries. For example, if there are two through holes in the preform, there may be two core rods and different numbers or types of punches.

It will further be appreciated that while a lower tool set was described having differential elasticity described above, that the same differential elasticity might employed in an upper tool set or and upper tool set and a lower tool set simultaneously. In some instances, it will be appreciated that the instantaneous relaxation of the tool members could instigate stress cracking, even from the upper tool members.

It will further be appreciated that there are other logical constructs for considering the differential deflection described in the tool set above. For example, for a lower tool set, it will be the case that the amount of positional deflection from compression and subsequent relaxation may be set to be lower in a tool member having a preform contacting surface above that of another tool member.

It will also be appreciated that while, in the example provided above, there are three lower tool members in which two of the lower punches/tool exhibit similar deflection with the third punch/tool having a different amount of deflection, that it is contemplated that where there are more than two tool members in the respective upper or lower tool set, that these three members may have three different positional deflection amounts. This may be based on a number of considerations such as preform geometry. For example, there may be three or more positional deflection values when there are three or more positional heights for particular compact.

Thus, a tool and die set and related method of use of the same is described for the formation of a powder metal preform. In contrast to traditional systems which have equalized elasticity across the tool components, the disclosed system intentionally creates differential responses across at least some of the tool members in order to help avoid cracking of the preform.

It should be appreciated that various other modifications and variations to the preferred embodiments can be made within the spirit and scope of the invention. Therefore, the invention should not be limited to the described embodiments. To ascertain the full scope of the invention, the following claims should be referenced.

REFERENCE NUMERALS 10 tool and die set
12 preform
14 die
16 upper tool set
18 lower tool set
20 die body
22 top side
24 bottom side
26 die cavity
28 upper punch
30 flange
32 lower preform-contacting surface
34 opening
36 outer portion
38 lower outer punch
40 lower outer adaptor
42 lower outer clamp ring
44 middle portion
46 lower middle punch
48 lower middle adaptor
50 lower middle clamp ring
52 inner portion
54 lower inner punch
56 lower inner adaptor
58 lower inner clamp ring
60 core rod
62 outward facing surface (of core rod 60)
64 inward facing surface
66 outward facing surface (of lower inner punch 54)
68 inward facing surface ((of lower middle punch 46)
70 outward facing surface (of lower middle punch 46)
72 inward facing surface (of lower outer punch 38)
74 outward facing surface (of lower outer punch 38)
76 inward facing surface (of die cavity 26)
78 preform contacting surface (of lower outer punch 38)
80 preform contacting surface (of lower middle punch 46)
82 preform contacting surface (of lower inner punch 54)
84 flange (of lower outer punch 38)
86 flange (of lower middle punch 46)
88 flange (of lower inner punch 54)
90 lower end (of outer portion 36)
92 lower end (of middle portion 44)
94 lower end (of inner portion 52)
96 top disc-like section
98 upwardly axially facing surface
100 downwardly axially facing surface
102 inner circular wall
104 outer circular wall
106 axially facing inner wall surface
108 axially facing outer wall surface
110 recess
112 radially outward facing surface
114 radially inward facing surface
116 through hole
118 radially inward facing wall
120 radially outward facing wall
122 upper surface (of core rod 60)
124 powder metal

What is claimed is:

1. A method of using a tool and die set in a press, the tool and die set including a die having a die cavity formed therein in which the die cavity extends from a top side to a bottom side of the die, at least one lower tool member of a lower tool set received in the die cavity from the bottom side of the die, and at least one upper tool member of an upper tool set being receivable in the die cavity from the top side of the die, the method comprising:
filling the die cavity with a powder metal;
lowering the at least one upper tool member into the die cavity from the top side of the die;
compacting the powder metal in the die cavity by application of a compressive load by the upper tool set and the lower tool set by opposing upper and lower faces of the at least one lower tool member and the at least one upper tool member by actuation of the lower tool set and the upper tool set by the press to respective positions in which the die, the at least one lower tool member, and the at least one upper tool member collectively define the geometry of the preform under the compressive load; and
lifting the at least one upper tool member from the die, thereby removing the compressive force and relaxing the upper tool set and the lower tool set;
wherein at least one of the at least one upper tool member and the at least one lower tool member includes a plurality of tool members in which a first tool member of the plurality of tool members has a first elastic response under the compressive load resulting in a first amount of positional deflection of a first preform-contacting surface of the first tool member and in which a second tool member of the plurality of tool members has a second elastic response under the compressive load resulting in a second amount of positional deflection of a second preform-contacting surface in the second tool member with the first amount of positional deflection being different than the second amount of positional deflection.

2. The method of claim 1, wherein the preform includes a plurality of sections with at least two of the plurality of sections having different heights and the differential deflections result in partial stripping of at least one of the section from at least one of the tool members.

3. The method of claim 1, wherein the first amount of positional deflection is greater than the second amount of positional deflection and wherein the first amount of positional deflection is between 0.02 mm to 0.2 mm different from the second amount of positional deflection.

4. The method of claim 1, wherein the plurality of tool members further includes a third tool member and the third tool member has a third elastic response under the compressive load resulting in a third amount of positional deflection in the third tool member wherein the third amount of positional deflection is different than the first amount of positional deflection and the second amount of positional deflection.

5. The method of claim 1, wherein the plurality of tool members further includes a third tool member and the third tool member has a third elastic response under the compressive load resulting in a third amount of positional deflection in the third tool member wherein the third amount of positional deflection is the same as one of the first amount of positional deflection and the second amount of positional deflection.

6. The method of claim 1, wherein the first tool member and the second tool member are included in the at least one lower tool member.

7. The method of claim 6, wherein the lower tool set includes a first adaptor supporting the first tool member and a second adaptor supporting the second tool member and wherein the first adaptor at least partially accounts for the first amount of positional deflection of the first tool member and the second adaptor at least partially accounts for the second amount of positional deflection of the second tool member.

8. The method of claim 6, wherein, during the step of compacting the powder metal, a first upper surface of the first tool member is positioned in the die cavity lower than a second upper surface of the second tool member relative to the top side of the die under the compressive load and wherein, upon release of the compressive load, the first tool member relaxes the first amount of positional deflection and the second tool member relaxes the second amount of positional deflection such that, upon relaxation, the second tool member does not apply a force to the preform.

9. The method claim 1, wherein at least two of the tool members in at least one of the at least one upper tool member and the at least one lower tool member have an asymmetrical elastic response to the compressive load.

10. The method of claim 1, further comprising the step of ejecting the preform from the die cavity by raising the upper surfaces of the at least one lower tool member to be level with the top side of the die.

11. A tool and die set for use in a press for the compaction of a powder metal into a preform, the tool and die set comprising:
a die having a die cavity formed therein, the die cavity extending from a top side to a bottom side of the die;
a lower tool set comprising at least one lower tool member receivable in the die cavity from the bottom side of the die;
an upper tool set comprising at least one upper tool member receivable in the die cavity from the top side of the die; and
wherein the die, the at least one lower tool member, and the at least one upper tool member are receivable in the press and the at least one lower tool member and the at least one upper tool member are each movable to a position in which the die, the at least one lower tool member, and the at least one upper tool member collectively define a geometry of the preform in the die cavity under a compressive load applied by the press;
wherein at least one of the at least one upper tool member and the at least one lower tool member includes a plurality of tool members;
wherein a first tool member of the plurality of tool members having a first elastic response under the compressive load resulting in a first amount of positional deflection of a first preform-contacting surface of the first tool member;
wherein a second tool member of the plurality of tool members having a second elastic response under the compressive load resulting in a second amount of positional deflection of a second preform-contacting surface of the second tool member; and
wherein the first amount of positional deflection is different than the second amount of positional deflection.

12. The tool and die set of claim 11, wherein the plurality of tool members further includes a third tool member and the third tool member has a third elastic response under the compressive load resulting in a third amount of positional deflection in the third tool member wherein the third amount of positional deflection is different than the first amount of positional deflection and the second amount of positional deflection.

13. The tool and die set of claim 11, wherein the plurality of tool members further includes a third tool member and the third tool member has a third elastic response under the compressive load resulting in a third amount of positional deflection in the third tool member wherein the third amount of positional deflection is the same as one of the first amount of positional deflection and the second amount of positional deflection.

14. The tool and die set of claim 11, wherein the first amount of positional deflection is greater than the second amount of positional deflection and wherein the first amount of deflection is between 0.02 mm to 0.2 mm different from the second amount of positional deflection.

15. The tool and die set of claim 11, wherein at least one of the first tool member and the second tool member come in contact with the preform as a result of the difference between the first and the second amounts of positional deflection.

16. The tool and die set of claim 15, wherein the lower tool set includes a first adaptor supporting the first tool member and a second adaptor supporting the second tool member and wherein the first adaptor at least partially accounts for the first amount of positional deflection of the first tool member and the second adaptor at least partially accounts for the second amount of positional deflection of the second tool member.

17. The tool and die set of claim 16, wherein at least one of the first adaptor and the second adaptor is formed by additive manufacturing.

18. The tool and die set of claim 15, wherein, during compaction, a first upper surface of the first tool member is positioned in the die cavity lower than a second upper surface of the second tool member relative to the top side of the die under the compressive load and wherein, upon release of the compressive load, the first tool member relaxes the first amount of positional deflection and the second tool member relaxes the second amount of positional deflection such that the second tool member does not apply a force upon relaxation to the preform resulting in cracking.

19. The tool and die set of claim 11, wherein at least two of the tool members in at least one of the at least one upper tool member and the at least one lower tool member have an asymmetrical elastic response to load.

20. The tool and die set of claim 16, wherein at least one of the first adaptor and the second adaptor is formed by three-dimensional printing.

* * * * *